United States Patent
Zhao et al.

(10) Patent No.: US 7,382,731 B1
(45) Date of Patent: Jun. 3, 2008

(54) METHOD AND APPARATUS FOR UPDATING PROBABILISTIC NETWORK ROUTING INFORMATION

(75) Inventors: Fuyong Zhao, Sunnyvale, CA (US); Bruce Moon, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 952 days.

(21) Appl. No.: 10/382,639

(22) Filed: Mar. 5, 2003

(51) Int. Cl.
*H04J 3/14* (2006.01)
*H04L 12/28* (2006.01)

(52) U.S. Cl. .................. 370/236; 370/392; 370/410

(58) Field of Classification Search ............... None
See application file for complete search history.

(56) References Cited

U.S. PATENT DOCUMENTS

| | | | |
|---|---|---|---|
| 5,933,425 A * | 8/1999 | Iwata | 370/351 |
| 6,377,551 B1 * | 4/2002 | Luo et al. | 370/238 |
| 6,584,093 B1 * | 6/2003 | Salama et al. | 370/351 |
| 6,594,268 B1 * | 7/2003 | Aukia et al. | 370/400 |
| 6,744,774 B2 * | 6/2004 | Sharma | 370/401 |
| 6,813,272 B1 * | 11/2004 | An et al. | 370/395.21 |
| 6,944,675 B2 * | 9/2005 | Fujita | 709/240 |
| 7,047,316 B2 * | 5/2006 | Iwata et al. | 709/240 |
| 2001/0034853 A1 * | 10/2001 | Takatama et al. | 714/4 |
| 2003/0072269 A1 * | 4/2003 | Teruhi et al. | 370/252 |
| 2003/0202468 A1 | 10/2003 | Cain et al. | |
| 2003/0204616 A1 | 10/2003 | Billhartz et al. | |
| 2004/0010617 A1 * | 1/2004 | Akahane et al. | 709/243 |
| 2005/0025059 A1 * | 2/2005 | Rajan et al. | 370/238 |
| 2005/0128944 A1 | 6/2005 | Zhang et al. | |
| 2005/0246347 A1 * | 11/2005 | Kobayashi | 707/10 |

OTHER PUBLICATIONS

Gianni Di Caro, et al., "AntNet: Distributed Stigmergetic Control for Communications Networks," 1998, Journal of Artificial Intelligence Research, pp. 317-365.

C. Hedrick, "Routing Information Protocol," Jun. 1998, Network Working Group, Request for Comments: 1058, http://www.ietf.org/rfc/rfc1058.txt?number=1058, printed Jun. 5, 2003, 1-31.

Y. Rekhter, et al., "A Border Gateway Protocol 4 (BGP-4)," Mar. 1995, Network Working Group, Request for Comments: 1771, http://www.ietf.org/rfc/rfc1771.txt?number=1771, printed Jun. 5, 2003, pp. 1-54.

J. Moy, "OSPF Version 2," Jul. 1991, Network Working Group, Request for Comments: 1247, http://www.ietf.org/rfc/rfc1247.txt?number=1247, printed Jun. 5, 2003, pp. 1-177.

(Continued)

*Primary Examiner*—Andrew C. Lee
(74) *Attorney, Agent, or Firm*—Hickman Palermo Truong & Becker LLP

(57) ABSTRACT

A method of updating probabilistic network routing information is disclosed. A "backward ant" data packet is received. The backward ant data packet contains information about the quality of a network route, at least a portion of which was selected based on a set of router-probability associations, and through which a "forward ant" data packet was transmitted. The set, which is associated with a particular destination router for which the forward ant data packet was destined, is updated based on the information.

39 Claims, 9 Drawing Sheets

OTHER PUBLICATIONS

S. Murphy, et al., "OSPF with Digital Signature," Jun. 1997, Network Working Group, Request for Comments: 2154, http://www.ietf.org/rfc/rfc2154.txt?number=2154, data retrieved Dec. 8, 2003, pp. 1-28.

David L. Mills, "Network Time Protocol (Version 3), Specification, Implementation and Analysis," Mar. 1992, Network Working Group, Request for Comments: 1305, http://www.ietf.org/rfc/rfc1305.txt?number=1305, data retrieved Dec. 8, 2003, pp. 1-107.

Marco Dorigo, et al., "The Ant Systems: Optimization by a colony of cooperating agents," IEEE Transactions on Systems, Man, and Cybernetics-Part B, vol. 26, No. 1, 1996, pp. 1-26.

Felix Cho Zhao, Cisco Systems, Inc., "ANTD: An Adaptive, Deterministic Ant Routing Algorithm," 2003, Document No. EDCS-255496, pp. 1-38.

Eric Bonabeau, et al., "Swarm Smarts," Scientific American, Mar. 2000, pp. 72-79.

Dimitri Bertsekas, et al., "Data Networks," Prentic Hall, 1992, pp. 365-369 and 393-400.

Andrew S. Tanenbaum, "Computer Networks," Second Edition, Prentice Hall, 1996, pp. 346-365.

Malvin H. Kalos, et al., "Monte Carol Methods, vol. I: Basics," 1986, pp. 1-3 and 129-140.

Richard Bellman, "Dynamic Programming," Princeton University Press, Princeton, NJ, 1957, 362 pages.

Bruce Davie, et al., "MPLS Technology and Applications," Morgan Kaufamann Publishers, 2000, 301 pages.

E. Crawley, et al., "A Framework for QoS-based Routing in the Internet," Aug. 1998, Network Working Group, Request for Comments:2386, http://www.ietf.org/rfc/rfc2386.txt?number=2386, data retrieved Jan. 14, 2004, pp. 1-35.

G. Apostolopoulus, et al., "QoS Routing Mechanisms and OSPF Extensions," Aug. 1999, Network Working Group, Request for Comments: 2676, http://www.ietf.org/rfc/rfc2676.txt?number=2676, data retrieved Jan. 14, 2004, pp. 1-47.

J. Moy, "OSPF Version 2," Jul. 1997, Network Working Group, Request for Comments: 2178, http://www.ietf.org/rfc/rfc2178.txt?number=2178, data retrieved Dec. 8, 2003, pp. 1-197.

Shigang Chen, et al., "Distributed Quality of Service Routing in High-Speed Networks Based on Selective Routing," IEEE, 1998, pp. 80-89.

Kang G. Shin, et al., "Distributed Route Selection for Establishing Real-Time Channels," Aug. 30, 1999, pp. 1-29.

Hussein F. Salama, et al., "A Distributed Algorithm for Delay-Constrained Unicast Routing," IEEE, 1997, 8 pages.

Apostolopoulos, G., et al., "QoS Routing Mechanisms and OSPF Extensions", Network Working Group, RFC 2676, Aug. 1999, 50 pages.

Moy, J., "OSPF Version 2", Network Working Group, RFC 2178, Cascade Communications Corp., Jul. 1997, 197 pages.

Zhao, Felix Cho, "ANTD: An Adaptive, Deterministic Ant Routing Algorithm", Cisco Systems, Document No. EDCS- 255496, Revision 0.1, dated Jul. 16, 2003, 38 pages.

Di Caro, Gianni, et al., "AntNet: Distributed Stigmergetic Control for Communications Networks", Al Access Foundation and Morgan Kaufmann Publishers, Journal of Artificial Intelligence Research 9, 1998, 49 pages.

\* cited by examiner

METHOD AND APPARATUS FOR UPDATING PROBABILISTIC NETWORK ROUTING INFORMATION

FIELD OF THE INVENTION

The present invention generally relates to data packet routing algorithms in computer networks. The invention relates more specifically to a method and apparatus for updating probabilistic network routing information.

BACKGROUND OF THE INVENTION

The approaches described in this section could be pursued, but are not necessarily approaches that previously have been conceived or pursued. Therefore, unless otherwise indicated herein, the approaches described in this section are not prior art to the claims in this application and are not admitted to be prior art by inclusion in this section.

Computers may communicate with each other through a network by sending data packets to each other. While there are numerous protocols according to which one computer may address a data packet to another computer, a protocol commonly used for this purpose is Internet Protocol (IP). Typically, a data packet that is structured according to IP (an "IP data packet") contains a source IP address and a destination IP address. By examining a destination IP address contained in an IP data packet, a network device can determine the identity of a computer to which the IP data packet ultimately should be transmitted.

The computer that originates an IP data packet (the "originating computer") is often not directly connected to the computer for which the IP data packet is destined (the "destination computer"). The originating computer and the destination computer often transmit IP data packets through several interconnected intermediate network devices, such as network routers. Each router maintains a routing table that contains information that the router uses to select one of potentially several directly connected network devices to which the router should forward an IP data packet. Because each such directly connected network device is connected to a port of the router, the router selects one of potentially several ports through which to forward the IP data packet.

By communicating the information in their routing tables to other routers and updating their routing tables based on information received from other routers, routers can attempt to "learn" from each other the network routes from different sources to different destinations. Routers communicate such routing table information using a routing protocol. Some examples of routing protocols are distance vector protocols, such as Routing Information Protocol (RIP), and link state protocols, such as Open Shortest Path First (OSPF) protocol. RIP is described in the Internet Engineering Task Force (IETF) Request For Comments (RFC) 1058. OSPF is described in IETF RFC 1247.

According to past approaches, once a router learned which port to select given a particular destination IP address, the router would always select that port when given that particular destination IP address until the router learned, through a routing protocol, that it should select a different port when given that particular destination IP address. Upon learning a new port to select given a particular destination IP address, the router would always select the new port when given that particular destination IP address, and would not continue to select the old port when given that particular destination IP address. In other words, there was nothing random about which port a router would select given a particular IP address; the selection was deterministic.

Deterministic selection suffers from some significant disadvantages. While the routing protocols described above can be used to teach a router to select a different port in the event that a network device connected to a particular port fails or is disconnected from the network, the routing protocols described above propagate information only slowly, potentially resulting in a temporary interruption in network communication. Furthermore, because only one port is selected for a particular destination IP address, a surge in data packet traffic to a particular destination IP address could overload the transmission capacity of the port, even while spare transmission capacity is available on other ports through which the particular destination IP address ultimately might be reached.

DiGaro, G. and Dorigo, M. (1998) "Ant Net: Distributed Stigmergetic Control for Communications Networks," *Journal of Artificial Intelligence Research (JAIR)*, 9:317-365, describes a theoretical probabilistic routing approach. This "Ant Net" approach is modeled after the behavior of ants, which determine a best route to a destination by stochastically selecting between routes based on pheromones deposited on those routes by other ants. As more ants follow a particular route, more pheromones are deposited on the particular route relative to other routes. As more pheromones are deposited on a particular route, more ants are likely to select the particular route over other routes. However, because the ants' behavior is probabilistic, there is always a chance that an ant may select a route other than the route on which the most pheromones have been deposited, thus increasing the probability that other ants will also select that other route.

While the Ant Net approach theoretically describes probabilistic routing, it lacks details on how to overcome some significant obstacles that are present in actually implementing such an approach in large networks. According to the Ant Net approach, every network device in a network participates in the routing protocol, and every network device—whether or not a router—has an entry in each router's routing table. Following this approach, routing tables of routers in large networks would be huge and unmanageable. Furthermore, the Ant Net approach does not provide a mechanism that accounts for the addition or removal of network devices from the network. In dynamic networks, the addition and removal of network devices is common.

Additionally, the Ant Net approach uses "mobile agents" to gather network information and update routing tables. A mobile agent is a packet that includes executable code in addition to data. The communication of executable code in addition to data consumes more network bandwidth than the communication of data alone. Allowing a router to execute code contained in a packet potentially compromises network security.

Based on the foregoing, there is a clear need for a method for quickly and securely updating probabilistic routing information in a network while keeping routing tables at a manageable size. There is a particular need for such a method for use in large, dynamic networks.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for updating probabilistic routing information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Updating Probabilistic Routing Information
   3.1 Process for Probabilistically Routing Data Packets Based On Destination Router-Subnet Associations
   3.2 Process for Associating Subnets With Destination Routers
   3.3 Process for Determining Neighbor Routers
   3.4 Process for Associating a Subnet With a Virtual Destination Router
   3.5 Process for Advertising External Routes
4.0 Implementation Mechanisms—Hardware Overview
5.0 Extensions and Alternatives 1.0 General Overview The needs identified in the foregoing Background, and other needs and objects that will become apparent from the following description, are achieved in the present invention, which comprises, in one aspect, a method of updating probabilistic routing information. A "backward ant" data packet is received. The backward ant data packet contains information about the quality of a network route, at least a portion of which was selected based on a set of router-probability associations, and through which a "forward ant" data packet was transmitted. The set, which is associated with a particular destination router for which the forward ant data packet was destined, is updated based on the information. Forward ant data packets and backward ant data packets are described in greater detail below.

Because the set of router-probability associations is associated with a destination router, a router does not need to maintain a separate set of router-probability associations for every separate destination network address in a network. As a result, routing tables may be kept to a manageable size even in very large networks. For example, to select a "next hop" for a data packet that specifies a particular destination IP address, a router may locate, in a routing table, a subnet that contains the particular destination IP address, and determine which destination router is associated with the subnet in the routing table. The next router to which the data packet will be transmitted may be selected probabilistically based on a set of router-probability associations that is associated with the destination router.

In other aspects, the invention encompasses a computer apparatus and a computer-readable medium configured to carry out the foregoing steps.

2.0 Structural and Functional Overview

Figure 1:
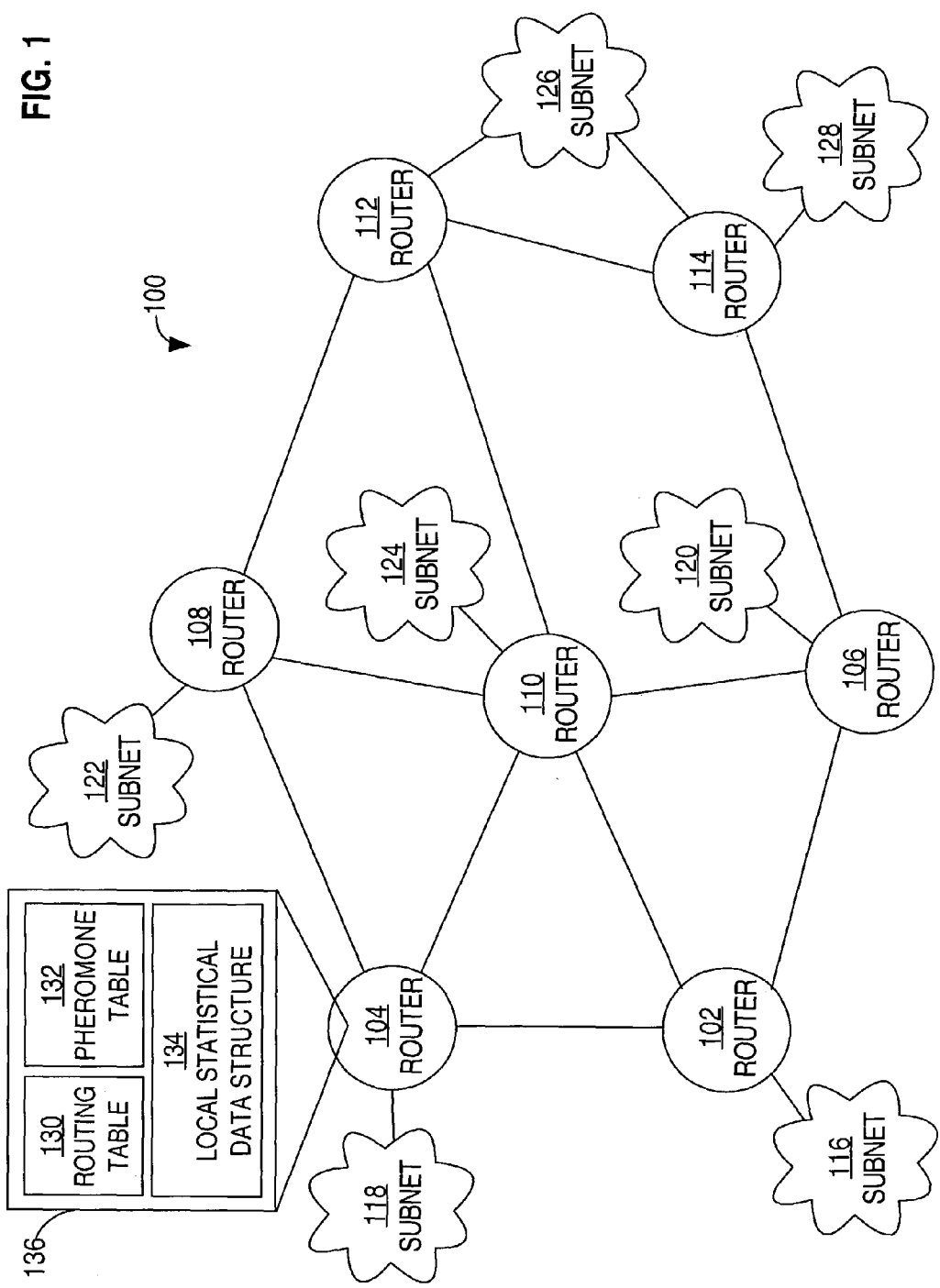
FIG. 1 is a block diagram that illustrates an overview of an example system that may be used to practice a method of updating probabilistic routing information.

FIG. 1 is a block diagram that illustrates an overview of an example system that may be used to practice a method of updating probabilistic routing information. A network 100 comprises routers 102-114. Any of subnets 116-128 may be a subnet of network 100 (an "internal subnet"), or a subnet of a network external to network 100 (an "external subnet"). The system shown is just one of many possible different configurations. Other embodiments may include fewer or more system components than those illustrated.

Router 102 is coupled communicatively to subnet 116 and routers 104, 106, and 110. Router 104 is also coupled communicatively to subnet 118 and routers 108 and 110. Router 106 is further coupled communicatively to subnet 120 and routers 110 and 114. Router 108 is also coupled communicatively to subnet 122 and routers 110 and 112. Router 110 is further coupled communicatively to subnet 124 and router 112. Router 112 is also coupled communicatively to subnet 126 and router 114. Router 114 is further coupled communicatively to subnets 126 and 128.

Each of routers 102-114 maintains separate routing information. When a router receives a data packet that is destined for a network address to which the router is not directly connected, the router consults the routing information to probabilistically select a next router to which the router will forward the data packet. For example, router 104 maintains routing information 136 that comprises a routing table 130, a pheromone table 132, and a local statistical traffic data structure 134. Others of routers 102-114 also each separately maintain a routing table, pheromone table, and local statistical traffic data structure.

Routing table 130 contains one or more entries. Each entry identifies a destination network, a destination router ID that is associated with the destination network, and a next hop that is associated with the destination router ID. An example of an incomplete routing table is shown in Sec. 3.4 below in Table 1.

The destination network identifies a range of destination network addresses. For example, the destination network may be an IP network, an IP subnet, an IP supernet, or a single IP host. The destination network may identify a range of destination network addresses by specifying an address mask, such as a subnet mask, in addition to a network address.

The destination router ID uniquely identifies a router within an autonomous system. For example, the router ID may be a 32-bit number. According to one embodiment, the router identified by the destination router ID may be a virtual router rather than an actual router. Virtual routers are described in greater detail below.

The next hop indicates an outgoing port that a router should use when forwarding data packets to a destination network address contained in the destination network. In broadcast, point-to-multipoint, and non-broadcast multi-access ("NBMA") networks, the next hop indicates a network address of a next router, if any, in a route to the destination network address. The next hop is defined separately for each data packet that is to be forwarded. Unlike in deterministic routing approaches, the next hop for a particular data packet is not determined prior to receiving that data packet. Instead, the next hop is selected probabilistically for each data packet that is to be forwarded.

For each destination router i other than router 104 in network 100, and for each "neighbor" router j that is directly connected to router 104, pheromone table 132 contains a separate probability value that expresses the desirability of forwarding a data packet to neighbor router j if the data packet is destined for a destination network that is associated with destination router i. Viewed another way, pheromone table 132 contains an entry for each destination router i. Each entry is a set of router-probability associations. In such a set, each neighbor router j is associated with a separate probability. According to one embodiment, the sum of the probabilities in any set of router-probability associations is one. An example of an incomplete pheromone table is shown in Sec. 3.4 below in Table 2.

The desirability of forwarding a data packet to a particular neighbor router is based on data traffic conditions in network 100. In one embodiment, router 104 maintains local statistical traffic data structure 134 to measure network data traffic conditions as experienced by forward ant data packets that are transmitted from router 104. Forward ant data packets are described in greater detail below. Local statistical traffic data structure 134 contains an array of trip time data structures. For each destination router i other than router 104 in network 100, the array contains a separate trip time data structure that is associated with destination router i. The trip time data structure associated with destination router i indicates the arithmetic mean value of times taken for forward ant data packets to be transmitted from router 104 to destination router i. The trip time data structure also indicates a variance associated with the arithmetic mean. The trip time data structure also stores a best time taken for any forward ant data packet to be transmitted from router 104 to destination router i.

According to one embodiment, one or more of the destination routers identified in the routing information described above may be virtual routers rather than actual routers. Virtual routers are described in greater detail below.

Forward ant data packets and backward ant data packets are used to explore the best network routes from one router to another router. Because each network address in a network is contained in a subnet that is associated with a router, a network route between any pair of network addresses can be derived from information about routes between each pair of routers in a network. Because routers typically comprise just a fraction of all the devices in a network, maintaining probabilistic routing information for network routes between routers is more practical than separately specifying probabilistic routing information for each pair of network devices in a network.

According to one embodiment, at regular intervals, each one of routers 102-114 asynchronously launches a forward ant data packet toward a randomly selected destination router. The randomly selected destination router may be an actual router or a virtual router. Forward ant data packets share the same router queues as non-ant data packets, so forward ant data packets experience the same network conditions that other data packets experience.

Each forward ant data packet is transmitted through one or more routers towards its destination. In response to receiving a forward ant data packet, a router probabilistically selects a next router to which to transmit the forward ant data packet. The selection is based on information such as the probabilities contained in a pheromone table. The selection may also be based on the comparative fullness of the data packet queues associated with the router's outgoing ports. The selection may also be based on information about the routers through which the forward ant data packet has been transmitted, to avoid selecting a router through which the forward ant data packet has already been transmitted.

Before transmitting a forward ant data packet to a next selected router, a router updates the forward ant data packet so that the forward ant data packet stores the router's identity and information about the quality of the link through which the forward ant data packet was transmitted to the router. Thus, each forward ant data packet contains updated information about the routers through which it has been transmitted, and the quality of the links through which it has been transmitted. The quality of a link may be based on the time taken for the forward ant to traverse the link. Such information may be indicated by a timestamp. The quality of a link may be based on network congestion as measured at a router.

According to one embodiment, the quality of a link may be a specified virtual link quality that is agreed upon by each proxy router that acts as a proxy to a virtual router for which the forward ant data packet is destined. Virtual routers and proxy routers are described in greater detail below.

According to one embodiment, if a router cannot transmit a forward ant data packet to any router other than a router to which the forward ant data packet has already been transmitted (i.e., if the forward ant data packet's network route would include a loop), then the information pertaining to routers and links through which the forward ant data packet was transmitted after the earlier transmission to the revisited router is removed from the information that the forward ant data packet stores. In one embodiment, the forward ant data packet is terminated if the time taken for the forward ant data packet to traverse the loop represents more than a specified portion of the total time taken for the forward ant data packet to traverse a network route that includes the loop. As a result, when a forward ant data packet arrives at a specified destination router, the network route about which the forward ant data packet stored information will not contain a loop.

In response to receiving a forward ant data packet, a destination router specified by the forward ant data packet generates a backward ant data packet, stores the forward ant data packet's information in the backward ant data packet, and terminates the forward ant data packet. Based on the forward ant data packet's information, the backward ant data packet is transmitted through the same one or more routers through which the forward ant data packet was transmitted, but in the reverse order.

In response to receiving a backward ant data packet, and based on the forward ant data packet's information that is stored in the backward ant data packet, a router updates its routing information, such as its pheromone table and local statistical traffic data structure. Based on the forward ant data packet's information, the router transmits the backward ant data packet to another router that had previously transmitted the forward ant data packet to the former router. Transmitting the backward ant data packet results in updating the probabilistic routing information of each router in a network route through which the forward ant data packet was transmitted.

Figure 2:
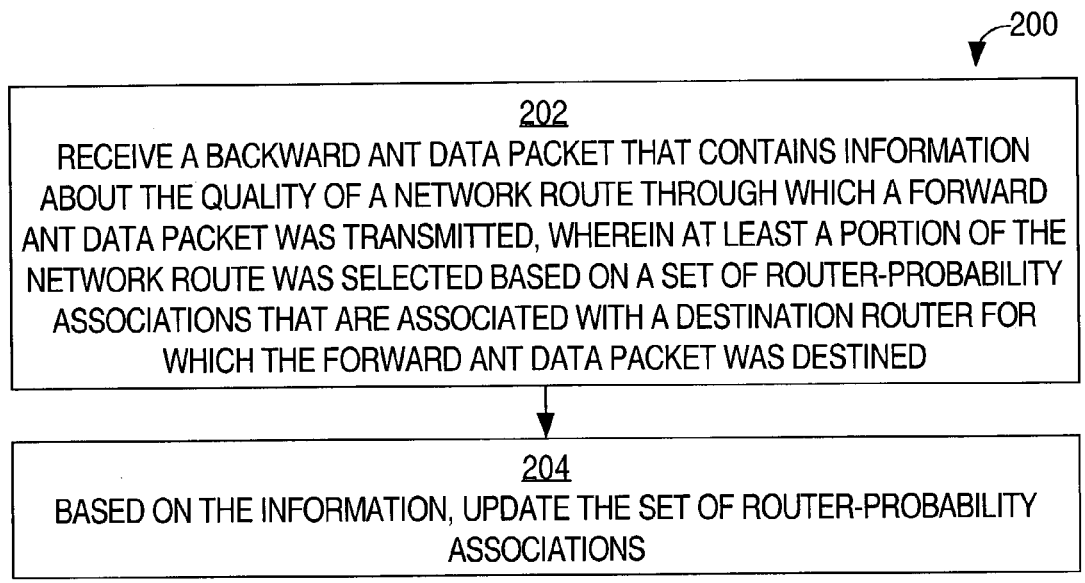
FIG. 2 is a flow diagram that illustrates a high level overview of one embodiment of a method of updating probabilistic routing information.

FIG. 2 is a flow diagram that illustrates a high level overview of one embodiment of a method 200 of updating probabilistic routing information. Such a method may be performed by any of many different devices, such as, for example, one of routers 102-114 described above.

In block 202, a backward ant data packet is received. The backward ant data packet contains information about the quality of a network route through which a forward ant data packet was transmitted. At least a portion of the network route was selected based on a set of router-probability associations that are associated with a destination router for which the forward ant data packet was destined. For example, if router 104 received a forward ant data packet that was destined for router 112, then, based on a set of router-probability associations that router 104 associates with router 112, router 104 might have selected router 108 as a next hop for the forward ant data packet. Consequently, router 104 may receive a backward ant data packet that contains information about the quality of a network route, comprising routers 102, 104, 108, and 112, through which the forward ant data packet was transmitted.

In block 204, the set of router-probability associations is updated based on the information. Continuing the example, based on the information about the quality of the network route, router 104 may update the set of router-probability associations on which router 104 based the selection of router 108 as a next hop for the forward ant data packet. Depending on the quality of the network router through which the forward ant data packet was transmitted, router 104 may strengthen or weaken the probability that router 104 will select router 108 as a next hop for other data packets that are destined for either router 112 or a subnet associated with router 112.

Because the set of router-probability associations is associated with a destination router instead of a non-router device, routing information does not need to contain a separate set of router-probability associations for every device in a network. As a result, routing tables may be kept to a manageable size even in very large networks, and do not need to be updated every time that a non-router device is added to or removed from such a network. Because each forward ant data packet is destined for a destination router, forward ant data packets are not sent to non-router devices in a network. Consequently, the overhead involved in updating network routing information is reduced.

3.0 Method of Updating Probabilistic Routing Information

Figure 3B:
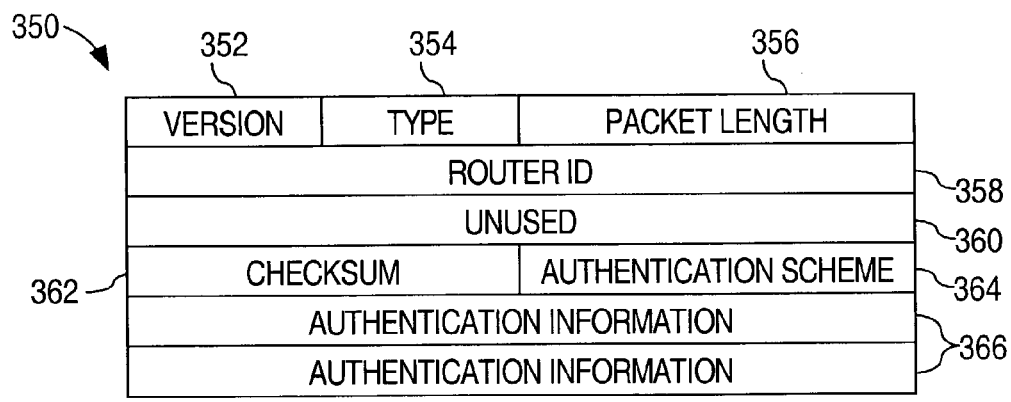
FIG. 3B is a block diagram that illustrates one embodiment of an ant data packet header.
Figure 3A:
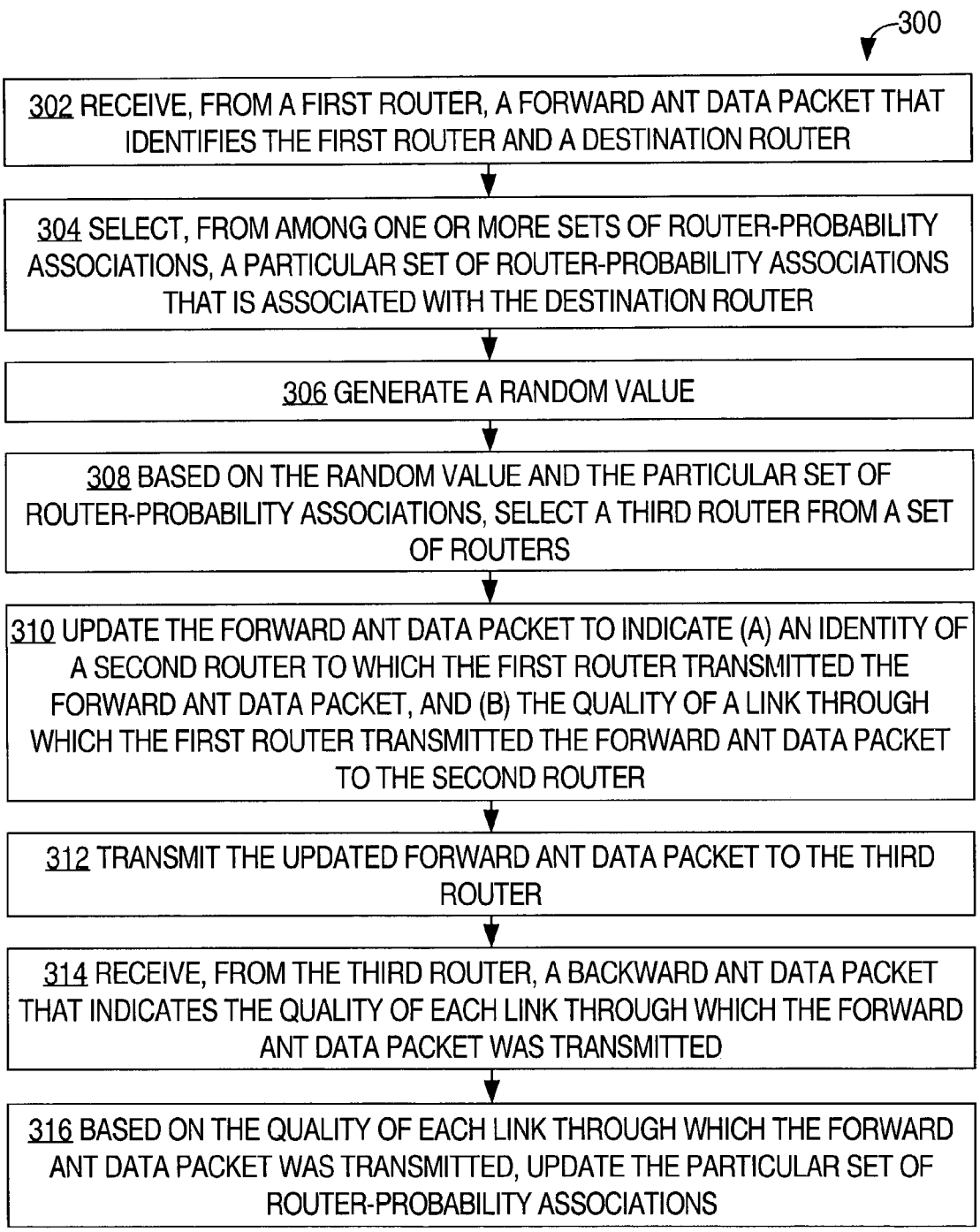
FIG. 3A is a flow diagram that illustrates one embodiment of a method of updating probabilistic routing information.

FIG. 3A is a flow diagram that illustrates one embodiment of a method 300 of updating probabilistic routing information. Such a method may be performed by any of many different devices, such as, for example, one of routers 102-114 described above.

In block 302, a forward ant data packet, which identifies a destination router and a first router, is received from a first router. For example, router 104 may receive, from router 102, a forward ant data packet. The forward ant data packet may identify router 112 as a router for which the forward data packet is destined. The forward ant data packet may also identify router 102 as a router through which the forward ant data packet has been transmitted. The forward ant data packet may be an IP data packet that indicates router 102's IP address as a source IP address, and router 112's IP address as a destination IP address.

In block 304, a particular set of router-probability associations that is associated with the destination router is selected from among one or more sets of router-probability associations. For example, router 104 may select, from pheromone table 132, an entry that is associated with router 112, which is the destination router identified by the forward ant data packet. The entry is a set of router-probability associations that contains a router-probability association for each of router 104's neighbor routers: router 102, router 108, and router 110. For example, the set of router-probability associations that is associated with router 112 in pheromone table 132 may associate router 108 with a probability of 0.4, router 110 with a probability of 0.4, and router 102 with a probability of 0.2.

In block 306, a random value is generated. For example, the random value may be a pseudo-random real number in the range of zero to one, excluding one.

In block 308, based on the random value and the particular set of router-probability associations, a third router is selected from a set of routers. The set of routers includes each of router 104's neighbor routers. According to one embodiment, a router through which the forward ant data packet has already been transmitted, as identified by information stored in the forward ant data packet, is excluded from the selection so that the forward ant data packet will not be sent back to such a router. The probabilities of the remaining eligible routers may be adjusted proportionately so that the sum of the probabilities equals one. Continuing the example, because the forward ant data packet indicates that it has already been transmitted through router 102, router 102 is excluded from the selection. The probabilities associated with routers 108 and 110 are each adjusted proportionately from 0.4 each to 0.5 each. Thus, if the random number falls between 0 and 0.5, excluding 0.5, then router 108 may be selected, and if the random number falls between 0.5 and 1, excluding 1, then router 110 may be selected. According to one embodiment, the next hop value associated with destination router 112 in routing table 130 is determined temporarily based on the selected router.

In block 310, the forward ant data packet is updated to indicate an identity of a second router to which the first router transmitted the forward ant data packet. The forward ant data packet is also updated to indicate the quality of a link through which the first router transmitted the forward ant data packet to the second router. The quality of a link may be based on a period of time required for the forward ant data packet to traverse the link between the first router and the second router—the smaller the period of time, the higher the quality of the link. For example, router 104 may push router 104's IP address onto a stack that is stored in the forward ant data packet to indicate the IP addresses of the routers through which the forward ant data packet was transmitted, and the order in which the forward ant data packet was transmitted to those routers. Router 104 may also push a timestamp onto such a stack to indicate a period of time that passed since a previous timestamp was pushed onto the stack.

In block 312, the updated forward ant data packet is transmitted to the third router. For example, if router 108 was selected in block 308, then router 104 transmits the forward ant data packet through the one of router 104's ports to which router 108 is connected, as indicated by the next hop temporarily associated with router 112 in routing table 130.

In block 314, a backward ant data packet is received from the third router. The backward ant data packet indicates the quality of each link through which the forward ant data packet was transmitted. For example, router 104 may receive a backward ant data packet which router 112 generated in response to receiving the forward ant data packet. If the forward ant data packet was transmitted from router 102 to router 104 to router 108 to router 112, then the backward ant data packet indicates the quality of the links from router 102 to 104, from router 104 to router 108, and from router 108 to router 112. In generating the backward ant data packet, router 112 obtained such link quality information from the forward ant data packet because each router that received the forward ant data packet updated the forward ant data packet to contain updated link quality information, such as in the manner described above in block 310.

In block 316, the particular set of router-probability associations is updated based on the quality of each link through which the forward ant data packet was transmitted. For example, in the particular set of router-probability associations that is associated with router 112 in pheromone table 130, the probability associated with router 108 may be increased from 0.4 to 0.7. The probability associated with router 110 may be decreased from 0.4 to 0.2. The probability associated with router 102 may be decreased from 0.2 to 0.1. The probabilities may be updated based on information contained in local statistical traffic data structure 134, which may also be updated based on the information that the backward ant data packet obtained from the forward ant data packet. One specific heuristic for updating routing information based on information carried by a backward ant is described in DiGaro, G. and Dorigo, M. (1998) "Ant Net: Distributed Stigmergetic Control for Communications Networks," *Journal of Artificial Intelligence Research* (*JAIR*), 9:317-365. However, various different heuristics could be used to update the routing information.

According to one embodiment, under certain circumstances, the backward ant data packet may be generated by a router other than the destination router indicated in the forward ant data packet. For example, if the third router acts as a proxy router for a virtual destination router that is indicated in the forward ant data packet, then the third router may generate the backward ant data packet even though the third router is not the virtual destination router. Virtual routers and proxy routers are described in greater detail below.

According to one embodiment, forward ant data packets and backward ant data packets are not mobile agents. As discussed above with reference to the Ant Net approach, mobile agents contain code that is executable by a router. Unlike the Ant Net approach, in one embodiment, forward ant data packets and backward ant data packets contain only data and no executable code. Routers themselves may store code that modifies the data in ant data packets, making the storage of such code within the ant data packets unnecessary. Transmitting ant data packets that do not contain executable code reduces the size of the ant data packets, thereby using less bandwidth, and also prevents potential security breaches that can result from executing code in a data packet that has been modified maliciously.

According to one embodiment, each ant data packet is an IP data packet. Each such ant data packet starts with a 24-byte header. FIG. 3B is a block diagram that illustrates one embodiment of an ant data packet header 350. The first byte 352 contains a version number. The second byte 354 contains a type. The type may specify that the ant data packet is a "discovery ant" data packet, an "update ant" data packet, an "update ant acknowledgement" data packet, a "forward ant" data packet, or a "backward ant" data packet. The third and fourth bytes 356 contain the length of the ant data packet, including the header. The next four bytes 358 identify the router ID of the ant data packet's source. The next four bytes 360 are unused, and set to zero. The next two bytes 362 contain an IP checksum of the contents of the ant data packet, excluding the authentication information described below. The next four bytes 364 identify an authentication procedure to be used when authentication the ant data packet. The next eight bytes 366 contain authentication information that the specified authentication scheme can use to authenticate the ant data packet.

3.1 Process for Probabilistically Routing Data Packets Based on Destination Router-Subnet Associations Based on probabilistic routing information that has been updated according to information carried by backward ant data packets, a router that receives a data packet destined for a particular destination network address, such as a destination IP address, can select, in a non-deterministic manner, a next router to which the data packet should be transmitted. Due to the nature of IP, each destination IP address is contained in a subnet that can be expressed in IP address notation. By associating a destination router with a subnet in a routing table, the size of the data structures that a router uses to store routing information are reduced, thereby decreasing the router's memory requirements and quickening outgoing port selection.

Figure 4:
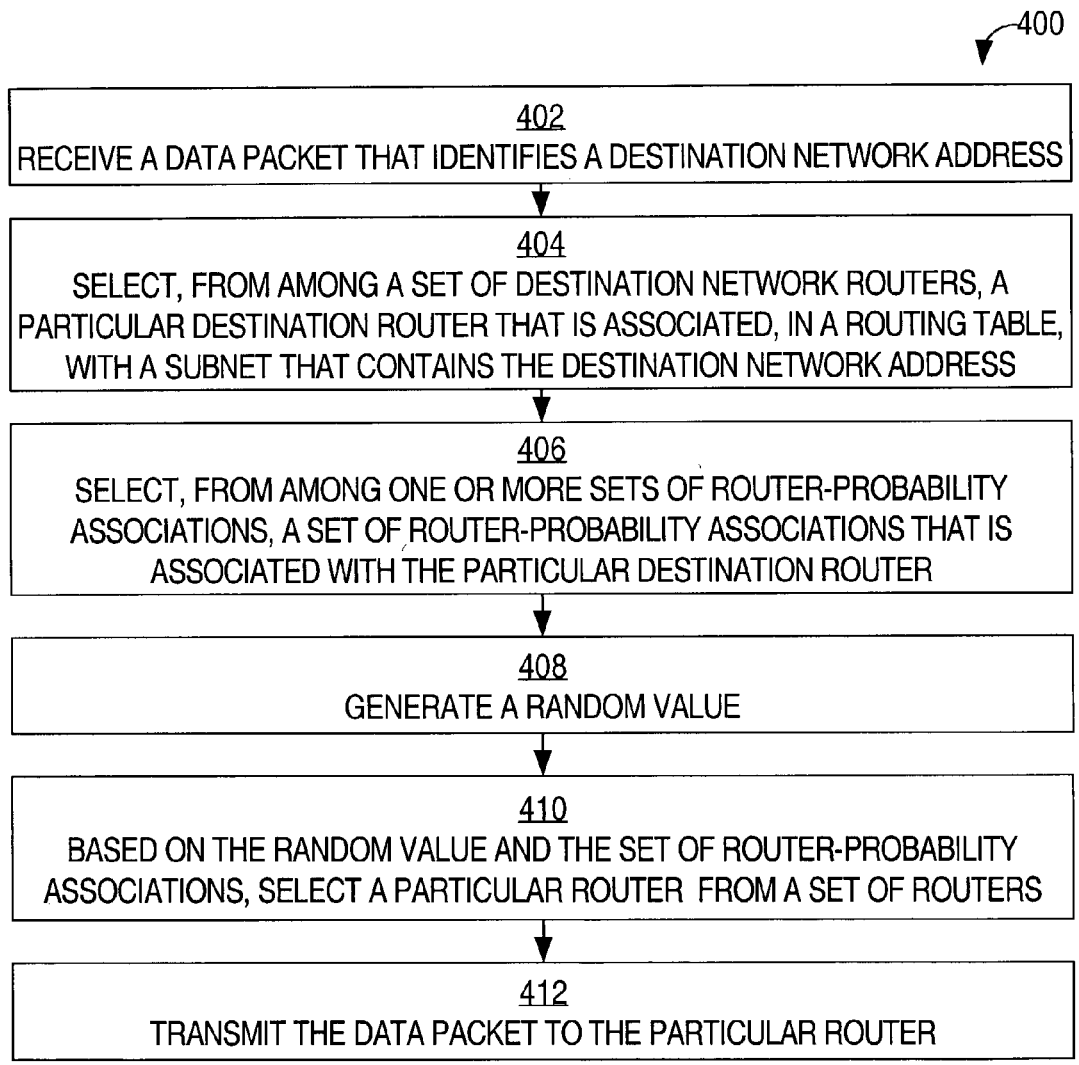
FIG. 4 is a flow diagram that illustrates one embodiment of a process for probabilistically routing data packets based on destination router-subnet associations.

FIG. 4 is a flow diagram that illustrates one embodiment of a process 400 for probabilistically routing data packets based on destination router-subnet associations. Such a process may be performed by any of many different devices, such as, for example, one of routers 102-114 described above.

In block 402, a data packet that identifies a destination network address is received. For example, router 104 may receive an IP data packet that identifies a destination network address in subnet 122.

In block 404, a particular destination router, which is associated in a routing table with a subnet that contains the destination network address, is selected from among a set of destination network routers. For example, router 104 may select, from routing table 130, a particular destination router that is associated with the subnet that most specifically matches the destination network address. According to one embodiment, the particular destination router may be a virtual router. Virtual routers are described in greater detail below.

In block 406, a set of router-probability associations, which is associated with the particular destination router, is selected from among one or more sets of router-probability associations. For example, router 104 may select, from pheromone table 132, a set of router-probability associations that is associated with the particular destination router. Thus, the destination router ID in routing table 130 may function as an index or pointer to a corresponding set of router-probability associations in pheromone table 132.

In block 408, a random value is generated. In block 410, a particular router is selected from a set of routers based on the random value and the set of router-probability associations that is associated with the particular destination router. The manner in which the particular router is selected is similar to the manner in which a next hop for a forward ant data packet is selected, as described above with reference to FIG. 3A.

In block 412, the data packet is transmitted to the particular router. Thus, data packets may be routed based on probabilistic routing information that has been updated according to the method described above with reference to FIG. 3A. Because data packets are routed based on associations between subnets and destination routers, many destination network addresses may be associated with a single destination router without adding separate routing table entries for each separate destination network address. This reduces the memory required to store routing information and increases the speed with which a next hop is selected for a given data packet.

3.2 Process for Associating Subnets with Destination Routers

In the process described above with reference to FIG. 4, a particular destination router is selected based on a subnet that is associated with the particular destination router. Large networks may comprise many subnets. Manually associating each subnet with a destination router would be an onerous task. Moreover, in dynamic networks, routers are almost constantly being added and removed. Such additions and removals may require frequent changes in associations between destination routers and subnets. Manually updating routing information in many routers to reflect correct associations between destination routers and subnets would be nearly impossible in some networks.

Figure 5:
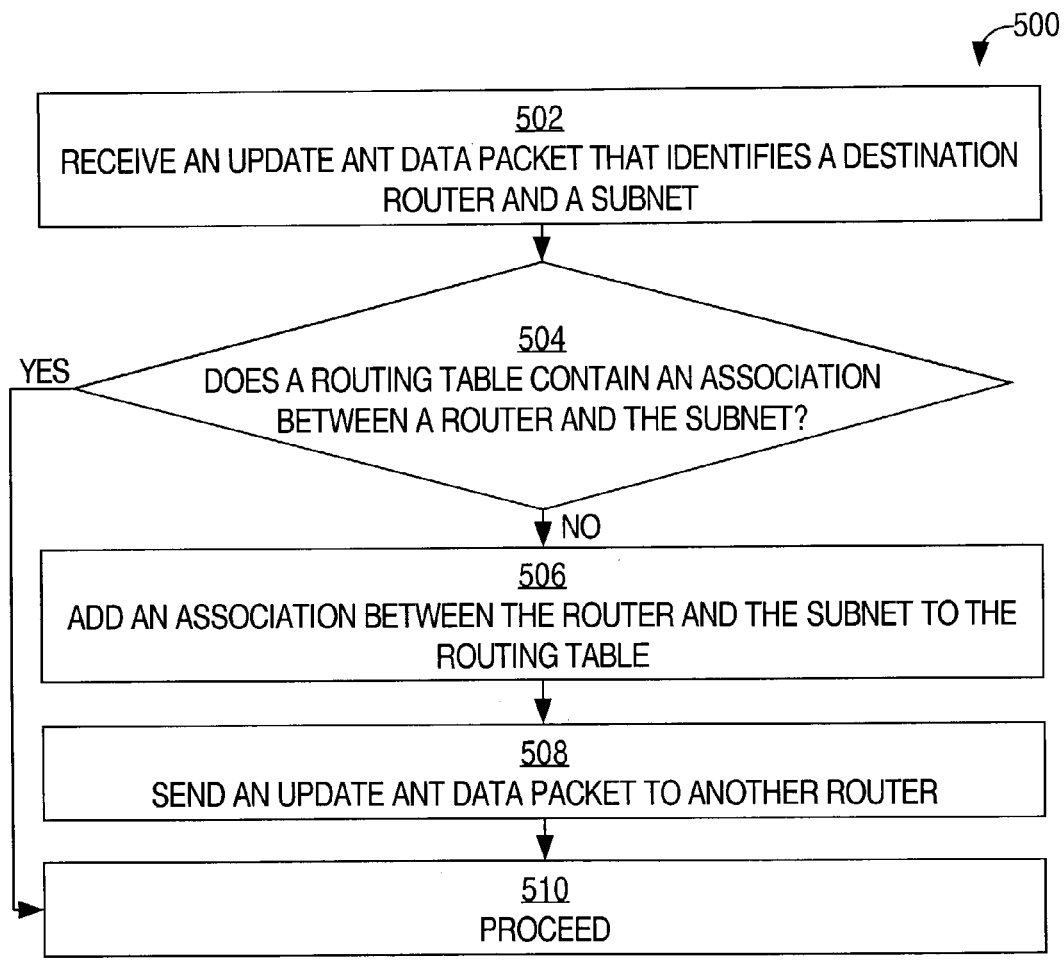
FIG. 5 is a flow diagram that illustrates one embodiment of a process for associating subnets with destination routers.

FIG. 5 is a flow diagram that illustrates one embodiment of a process 500 for associating subnets with destination routers. Such a process may be performed by any of many different devices, such as, for example, one of routers 102-114 described above.

In block 502, an "update ant" data packet is received. Each update ant data packet identifies a destination router and a subnet. For example, router 104 may receive an "update ant" data packet from router 102. The update ant data packet may indicate that router 102 is claiming an association with, or ownership of subnet 116, with which router 102 directly communicates. If only one router is connected to a subnet, and all network traffic to the subnet is transmitted through the router, then the router is said to "own" the subnet. The subnet may be either internal or external to the network of which the router is a part. For example, subnet 116 may be a subnet of network 100, or subnet 116 may be a subnet of a network other than network 100.

In block 504, in response to receiving the update ant data packet, it is determined whether a routing table contains an association between a router and the subnet. Continuing the example, in response to receiving the update ant data packet, router 104 may determine whether routing table 130 contains an association between any router and subnet 116. If the routing table does not contain an association between a router and the subnet, then control passes to block 506. Otherwise, control passes to block 510.

In block 506, an association between the destination router and the subnet is added to the routing table. For example, if router 104 determines that routing table 130 does not yet contain an association between any router and subnet 116, then router 104 may add an association between router 102 and subnet 116 to routing table 130.

In block 508, an update ant data packet is sent to another router. For example, router 104 may transmit the update ant data packet to routers 108 and 110 so that routers 108 and 110 may also update their routing tables. According to one embodiment, whenever a router updates its routing information according to "newly learned" information, it propagates the newly learned information to other routers in the network, as in blocks 506-508. In this way, every router in a network may rapidly learn about changes in the network's topology and automatically update its local routing information accordingly.

In block 510, the device that performs process 500 proceeds to function according to the device's configuration. By establishing which destination router "owns" a particular subnet, forward ant data packets may be sent to destination routers only, rather than every network device in a network. This reduces the overhead involved in updating routing information.

According to one embodiment, each update ant data packet contains a sequence of <type, length, value> triplets, where each triplet represents a particular type of router information. Some of the different types of router information are router ID information, neighbor information, internal subnet information, and external subnet information.

Router ID information may comprise two separate items. One item is the identity of the router to which the information in the update ant data packet refers. The other item is the identity of the router that generated the update ant data packet. These items may be the same. However, if the update information refers to a virtual router, then the router that generated the update ant data packet is a router that acts as a proxy router for the virtual router. Virtual routers and proxy routers are described in greater detail below.

Neighbor information may comprise a list of routers that are directly connected to the router to which the information in the update ant data packet refers. A particular neighbor router's ID, such as the neighbor router's loopback IP address, may identify a particular neighbor router. Neighbor information may convey changes in network topology.

Internal subnet information comprises a list of internal subnets that a router owns. Internal subnets are subnets within the same autonomous system as the router that owns the subnets. Routers within the same autonomous system typically use the same routing protocol. A separate subnet number and subnet mask may represent each internal subnet.

External subnet information comprises a list of external subnets that a router owns. External subnets are subnets that are not within the same autonomous system as the router that owns the subnets. Routers within different autonomous systems may use different routing protocols. A separate subnet number, subnet mask, metric type, and metric value may represent each external subnet. Metric types and metric values are described in greater detail below.

According to one embodiment, whenever a particular router discovers a new neighbor router, the particular router sends all of the particular router's routing information in an update ant data packet to the new neighbor router. Thereafter, the particular router sends incrementally updated information to the neighbor router when the particular router's routing information changes.

For example, when a router determines that a link to a particular subnet can no longer be used to transmit data packets to the particular subnet, the router may send an update ant data packet that indicates that the link can no longer be used. When neighbor routers receive the update ant data packet, the neighbor routers can update their routing information so that data packets no longer will be transmitted through a network route that includes the unusable link.

In one embodiment, when a particular router no longer has any neighbors, such as when the particular router fails, then each other router removes the particular router from its routing information, such as its pheromone table and routing table.

According to one embodiment, when a particular router receives an update ant data packet from another router, the particular router sends an update ant acknowledgement data packet to the other router in response. If a particular router sends an update ant data packet to another router and does not receive an update ant acknowledgement data packet from the other router within a specified period of time, then the particular router retransmits the update ant data packet to the other router.

3.3 Process for Determining Neighbor Routers

As described above, a particular router may update its routing information based on an update ant data packet that is received from another router. The other router might have sent the update ant data packet in response to a change in the other router's routing information. Alternatively, the other router might have sent the update ant data packet in response to receiving a "discovery ant" data packet from the particular router. According to one embodiment, each router in an autonomous system broadcasts a discovery ant data packet through each of that router's outgoing ports at specified intervals of time, such as every 10 seconds. Periodically transmitted discovery ant data packets serve as a sort of "heartbeat" of a particular router by which other routers may discover the addition or removal of the particular router from a network.

Figure 6:
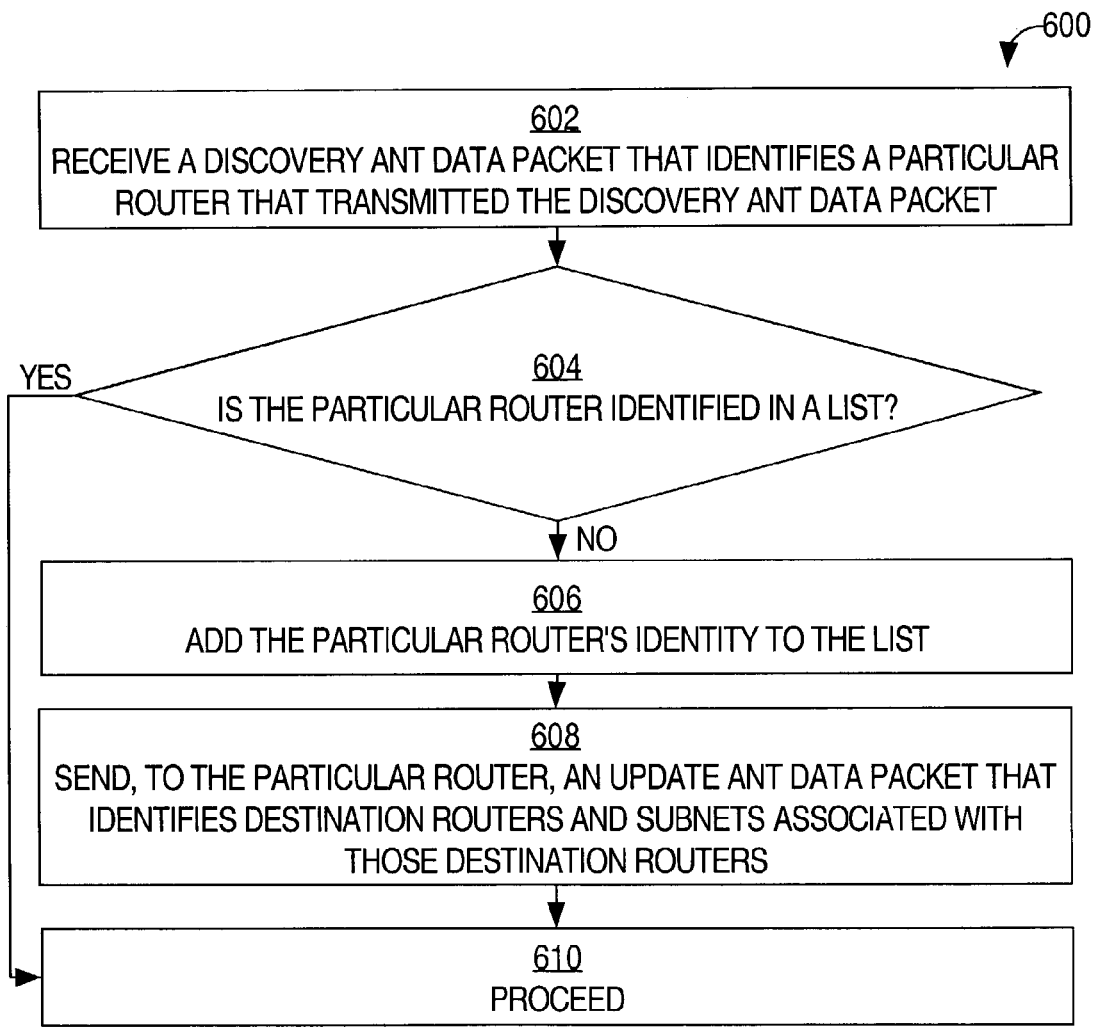
FIG. 6 is a flow diagram that illustrates one embodiment of a process for discovering a router.

FIG. 6 is a flow diagram that illustrates one embodiment of a process 600 for discovering a router. Such a process may be performed by any of many different devices, such as, for example, one of routers 102-114 described above.

In block 602, a discovery ant data packet is received. The discovery ant data packet identifies a particular router that transmitted the discovery ant data packet. For example, router 104 may receive a discovery ant data packet that identifies router 102 as the sender. In one embodiment, the discovery ant data packet specifies a time-to-live of 1, so that routers that receive a broadcasted discovery ant data packet will not retransmit the discovery ant data packet.

In block 604, in response to receiving the discovery ant data packet, it is determined whether the particular router is identified in a list. For example, router 104 may determine whether router 102 is identified in a neighbor router list that router 104 maintains. Router 104 may determine whether router 102 is associated with any subnet in routing table 130. If the particular router is not identified in the list, then control passes to block 606. Otherwise, control passes to block 610.

In block 606, the particular router's identity is added to the list. For example, router 104 may add router 102's identity to a neighbor router list that router 104 maintains. Router 104 may add router 102's identity to routing table 130.

In block 608, an update ant data packet is sent to the particular router. The update ant data packet identifies destination routers and subnets associated with those destination routers. For example, router 104 may send an update ant data packet to router 102. The update ant data packet may contain all of router 104's routing information, including all of the router-subnet associations in routing table 130.

In block 610, the device that performs process 600 proceeds to function according to the device's configuration. Thus, characteristics of each router in a network may be automatically "learned" by each other router in a network. This allows the sending of forward ant data packets to many destination routers in a large, dynamic network without manually specifying every destination router in a network.

Figure 7:
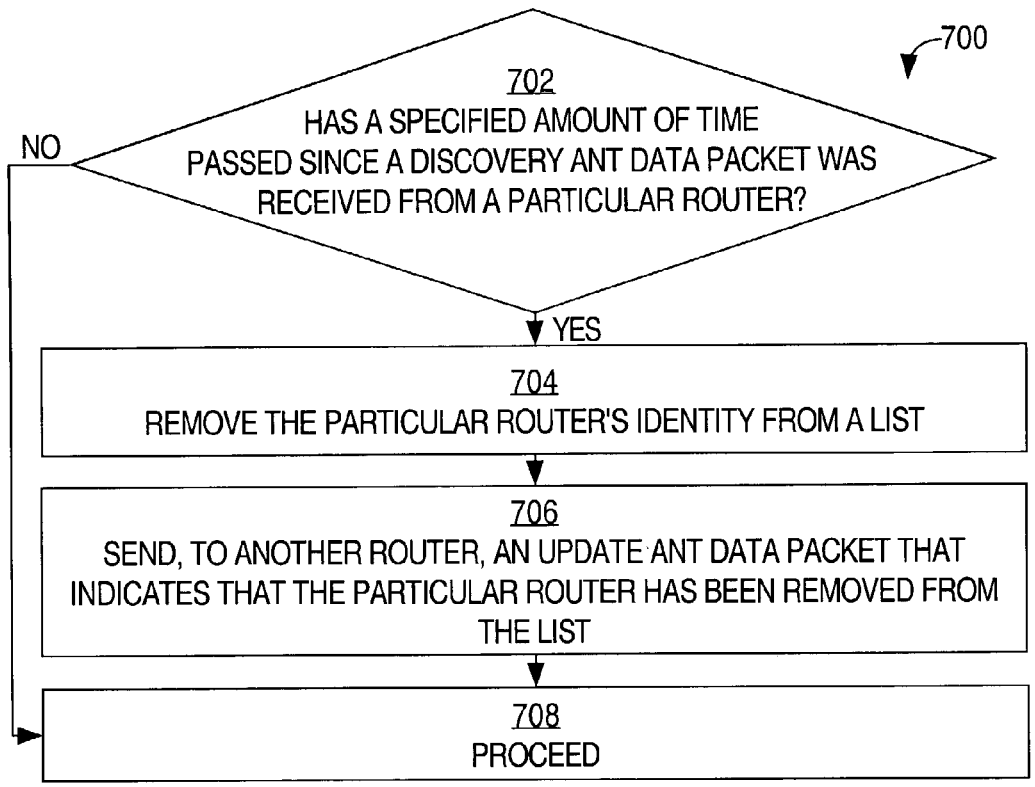
FIG. 7 is a flow diagram that illustrates one embodiment of a process for discovering that a router has been removed from a network.

In a large, dynamic network, routers are often frequently removed. Automatically discovering router removals helps remaining routers to update their routing information quickly so that any interruption in network traffic is minimized. FIG. 7 is a flow diagram that illustrates one embodiment of a process 700 for discovering that a router has been removed from a network. Such a process may be performed by any of many different devices, such as, for example, one of routers 102-114 described above.

In block 702, it is determined whether a specified amount of time has passed since a discovery ant data packet was received from a particular router. For example, router 102 may maintain, for each neighbor router in router 102's list of neighbor routers, a separate timestamp that can be used to determine elapsed time since a discovery ant data packet was received from that neighbor router. Whenever router 102 receives a discovery ant data packet from a neighbor router, router 102 updates the timestamp for that neighbor router. If each router in network 100 is configured to broadcast a discovery ant packet every N seconds, and at least M·N seconds has passed since router 102 has received a discovery ant data packet from router 106, then router 102 may determine that at least M consecutive discovery ant data packets have not been received from router 106. If M is greater than a specified threshold, then router 102 may conclude that router 106 has been removed from network 100. If a specified amount of time has passed since a discovery ant data packet was received from a particular router, then control passes to block 704. In other words, if a specified consecutive number of discovery ant data packets have not been received from a particular router, then control passes to block 704. Otherwise, control passes to block 708.

In block 704, the particular router's identity is removed from a list. Continuing the example, router 102 may remove router 106's identity from a list of router 102's neighbor routers. Router 102 may remove, from a routing table that router 102 maintains, an association between router 106 and subnet 120.

In block 706, an update ant data packet is sent to another router. The update ant data packet indicates that the particular router has been removed from the list. Continuing the example, router 102 may send, to router 104, an update ant data packet that indicates that router 106 has been removed from network 100. In block 708, the device that performs process 700 proceeds.

Figure 8:
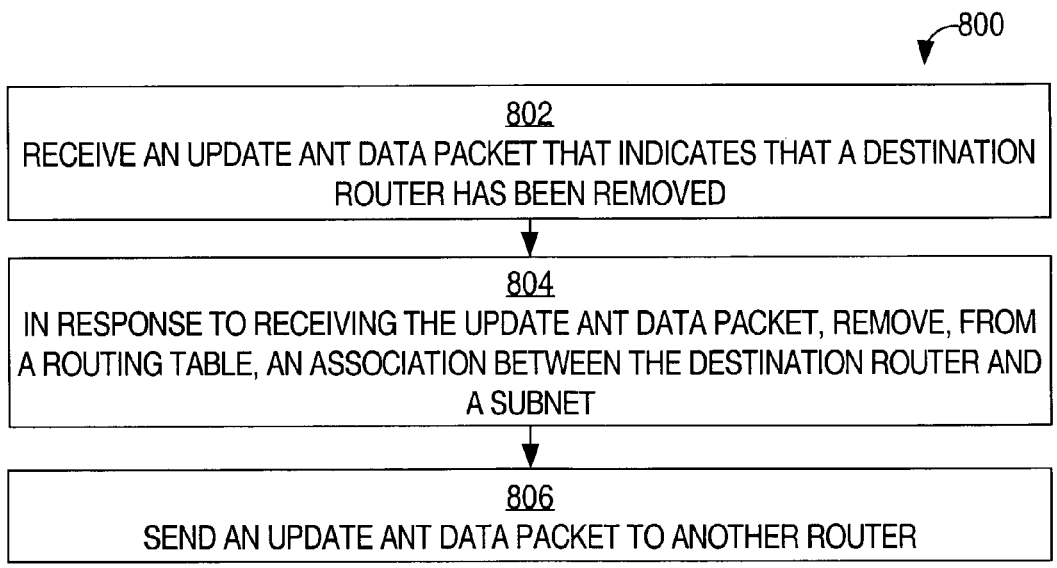
FIG. 8 is a flow diagram that illustrates one embodiment of a process for removing an association between a destination router and a subnet.

Because a router sends an update ant data packet to the router's neighbor routers whenever the router's routing information changes, removal information may be rapidly propagated to every other router in the network. FIG. 8 is a flow diagram that illustrates one embodiment of a process 800 for removing an association between a destination router and a subnet. Such a process may be performed by any of many different devices, such as, for example, one of routers 102-114 described above.

In block 802, an update ant data packet is received. The update ant data packet indicates that a destination router has been removed. For example, router 104 may receive an update ant data packet that indicates that router 106 has been removed from router 102's list of neighbor routers.

In block 804, an association between the destination router and a subnet is removed from a routing table in response to receiving the update ant data packet. Continuing the example, in response to receiving the update ant data packet, router 104 may remove an association between router 106 and subnet 120 from routing table 130.

In block 806, an update ant data packet is sent to another router. Continuing the example, router 104 may forward the update ant data packet to routers 108 and 110. Because each router sends an update ant data packet to that router's neighbors whenever that router's routing information changes, each router in network 100 automatically receives information indicating removal of router 106 and can update locally maintained routing information accordingly.

3.4 Process for Associating a Subnet with a Virtual Destination Router

Multiple routers may be directly connected to network devices in the same subnet, and data packets destined for network devices in the subnet may be transmitted though any of a plurality of routers that are so connected. Associating a single subnet with more than one destination router in a routing table could result in selecting only one such destination router, such as the first occurring destination router, every time that a data packet is to be transmitted to the subnet, leading to unbalanced network traffic. Associating a single subnet with more than one destination router also increases the size of a routing table.

According to one embodiment, a subnet that would be associated with multiple destination routers in a routing table is associated with a single virtual router instead. The virtual router is information that represents and appears to be an actual router with the virtual router's identity. The virtual router's network address may be the subnet address of the subnet with which the virtual router is associated. The multiple destination routers that otherwise would have been associated with the subnet may act as proxy routers for the virtual router. Each proxy router is configured to detect forward ant data packets that are destined for the virtual router, and to generate corresponding backward ant data packets. Other routers may send forward ant data packets to a virtual router in the same manner that those other routers would send forward ant data packets to an actual router. Each proxy router is also configured to periodically transmit, to other routers, forward ant data packets that identify the virtual router as the forward ant data packet's originator.

Figure 9:
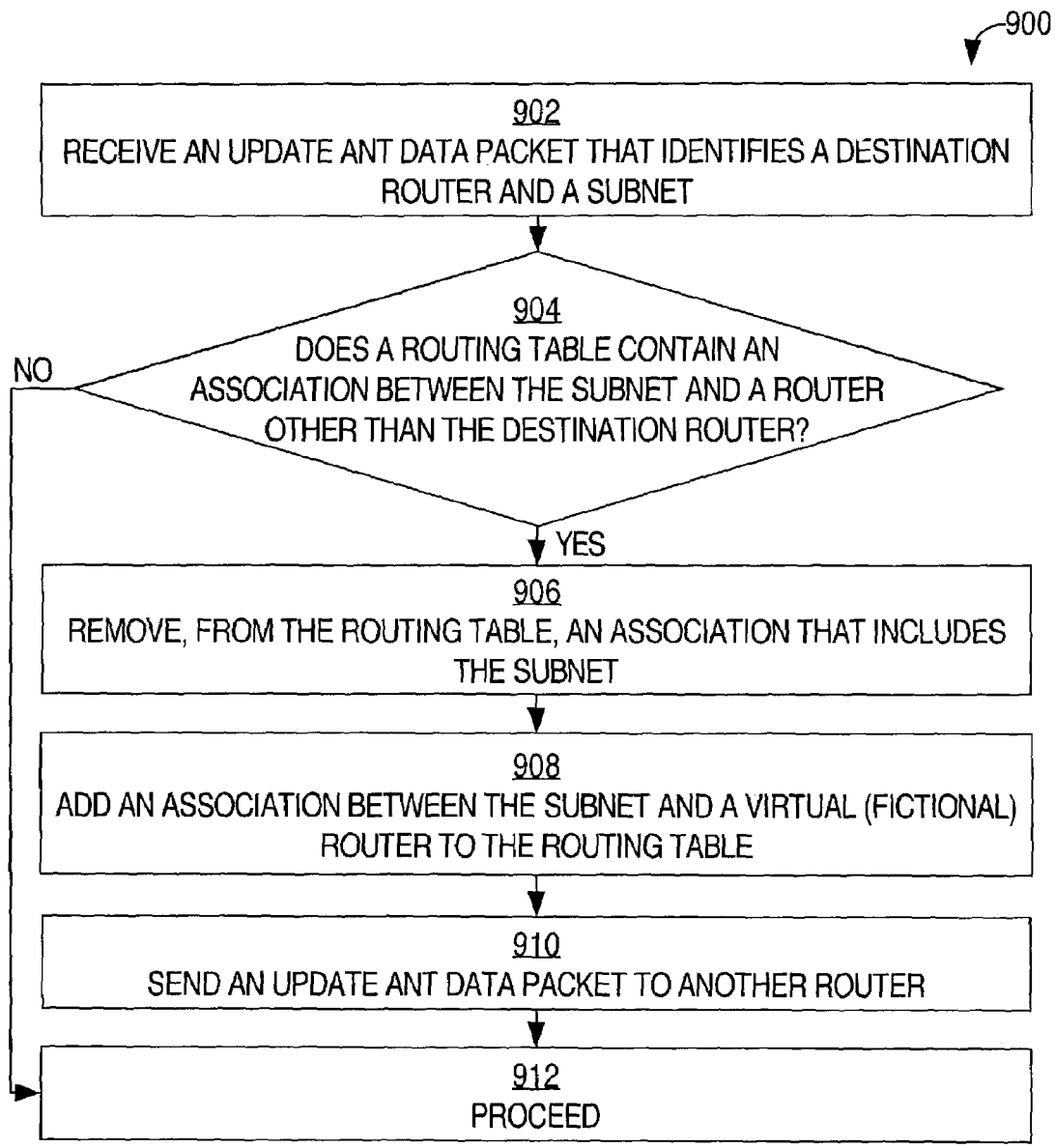
FIG. 9 is a flow diagram that illustrates one embodiment of a process for associating a subnet with a virtual destination router.

FIG. 9 is a flow diagram that illustrates one embodiment of a process 900 for associating a subnet with a virtual destination router. Such a process may be performed by any of many different devices, such as, for example, one of routers 102-114 described above.

In block 902, an update ant data packet is received. The update ant data packet identifies a destination router and a subnet. For example, router 104 may receive an update ant data packet that indicates that router 114 claims ownership of subnet 126. The subnet may be an external subnet.

In block 904, in response to receiving the update ant data packet, it is determined whether a routing table contains an association between the subnet and a router other than the destination router. Continuing the example, router 104 may determine whether routing table 130 contains an association between subnet 126 and any router other than router 114. If the routing table contains an association between the subnet and a router other than the destination router, then control passes to block 906. Otherwise, control passes to block 912.

In block 906, an association that includes the subnet is removed from the routing table. Continuing the example, router 104 may remove an association between router 112 and subnet 126 from routing table 130. Router 104 may remove, from routing table 130, each association between any router and subnet 126.

In block 908, an association between the subnet and a virtual (fictional) destination router is added to the routing table. Continuing the example, router 104 may add an association between subnet 126 and a virtual router to routing table 130. The virtual router may be identified by subnet 126's subnet address. Thereafter, routers 112 and 114 are configured to act as proxy routers for the virtual router. Routers 112 and 114 may maintain data structures that indicate that routers 112 and 114 are to generate backward ant data packets upon receiving corresponding forward ant data packets that are destined for the virtual router. Router 104 may also add, to pheromone table 132, a set of router-probability associations that is associated with the virtual router.

In block 910, an update ant data packet is sent to another router. Continuing the example, router 104 may send an update ant data packet to routers 102, 108, and 110. The update ant data packet may indicate an association between subnet 126 and the virtual router that was added to routing table 130.

In block 912, the device that performs process 900 proceeds to function according to the device's configuration. Associating subnets with virtual routers greatly reduces the overhead required to update routing information, decreases the size of routing information, and hastens the selection of network routes.

An incomplete example routing table is shown in Table 1. The entries shown might be found at one time in routing table 130. In Table 1, "Virtual Router X" is a virtual destination router whose proxy routers include router 112 and router 114. The Next Hop value for each entry is specified as a probabilistic "flip" function whose value is separately and randomly determined for each data packet based on a corresponding set of router-probability associations in the pheromone table.

TABLE 1

EXAMPLE ROUTING TABLE

| Destination Network | Destination Router ID | Next Hop |
|---|---|---|
| Subnet 120 | Router 106 | Flip (Router 106) |
| Subnet 126 | Virtual Router X | Flip (Virtual Router X) |
| Subnet 128 | Router 114 | Flip (Router 114) |

An incomplete example pheromone table is shown in Table 2. The entries shown might be found at one time in pheromone table 132. Given the destination router shown at the top of the column and the particular router shown to the left of the row, the entry at the intersection of the column and row shows an example probability that the router that maintains the pheromone table, such as router 104, will select the particular router as a next hop for a data packet that is destined for the destination router or a subnet that the destination router owns. Thus, each column is a set of router-probability associations that is associated with a destination router.

TABLE 2

EXAMPLE PHEROMONE TABLE

| | Router 106 | Router 114 | Virtual Router X |
|---|---|---|---|
| Router 102 | .50 | .40 | .15 |
| Router 108 | .30 | .25 | .80 |
| Router 110 | .20 | .35 | .05 |

3.5 Process for Advertising External Routes

Routers that are external to an autonomous system might be configured to use a different routing protocol than that used within the autonomous system. When probabilistic routing information that relates to links within an external subnet is being updated, the updated routing information should account for the quality of portions of network routes that occur outside of the autonomous system. One way of accounting for the quality of such portions is through external route advertising.

According to one embodiment, update ant data packets that carry external route advertisements for each external route are flooded throughout an autonomous system, such as network 100. The router that owns an external subnet generated the update ant data packets that carry the external route advertisements for routes in the external subnet. As in OSPF, the external route cost metric that is advertised for a particular external route may be one of two types. Type 1 metrics are comparable to the cost of an intra-autonomous system route. Type 2 metrics are assumed to be larger than the cost of any intra-autonomous system route. Routers that own external subnets translate an external route cost metric that is advertised according to a protocol, such as Border Gateway Protocol, into an additional time delay indicated by the forward ant data packets. As a result, router-probability associations may be updated based on the external route cost metric. Border Gateway Protocol ("BGP") is described in IETF RFC 1771.

The exchange rate between the external route cost metric and the time delay value may be specified and adjusted according to a heuristic approach. The cost of an intra-autonomous system route, or path, is evaluated based on the quality of the links through which the forward ants were transmitted.

When more than one router is connected to an external subnet, an association between the external subnet and a virtual router may be added to routing tables. The virtual link quality specified by the proxy routers for the virtual router may be based on the external route cost metric. If the external route cost metric is Type 1, then the virtual router's ID and the virtual link quality are pushed to other routers through forward ant data packets. If the external route cost metric is Type 2, then the proxy router that advertises the smallest external route metric value transmits a backward ant data packet in which a very small delay has been factored into the link quality, and the other proxy routers send backward ant data packets in which a maximum delay has been factored into the link quality.

4.0 Implementation Mechanisms—Hardware Overview

Figure 10:
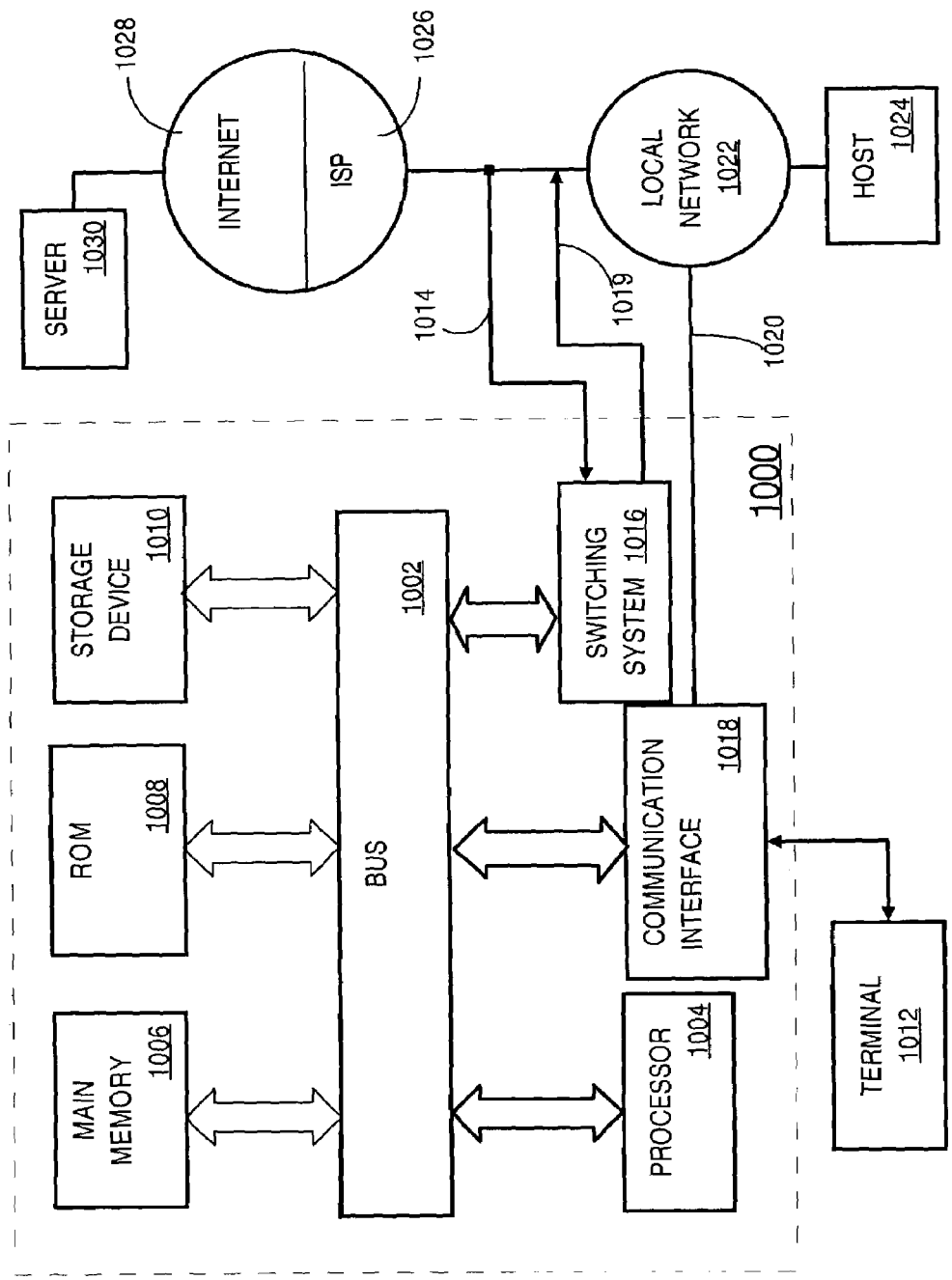
FIG. 10 is a block diagram that illustrates a computer system upon which an embodiment may be implemented.

FIG. 10 is a block diagram that illustrates a computer system 1000 upon which an embodiment of the invention may be implemented. The preferred embodiment is implemented using one or more computer programs running on a network element such as a router device. Thus, in this embodiment, the computer system 1000 is a router.

Computer system 1000 includes a bus 1002 or other communication mechanism for communicating information, and a processor 1004 coupled with bus 1002 for processing information. Computer system 1000 also includes a main memory 1006, such as a random access memory (RAM), flash memory, or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk, flash memory or optical disk, is provided and coupled to bus 1002 for storing information and instructions.

A communication interface 1018 may be coupled to bus 1002 for communicating information and command selections to processor 1004. Interface 1018 is a conventional serial interface such as an RS-232 or RS-422 interface. An external terminal 1012 or other computer system connects to the computer system 1000 and provides commands to it using the interface 1014. Firmware or software running in the computer system 1000 provides a terminal interface or character-based command interface so that external commands can be given to the computer system.

A switching system 1016 is coupled to bus 1002 and has an input interface 1014 and an output interface 1019 to one or more external network elements. The external network elements may include a local network 1022 coupled to one or more hosts 1024, or a global network such as Internet 1028 having one or more servers 1030. The switching system 1016 switches information traffic arriving on input interface 1014 to output interface 1019 according to predetermined protocols and conventions that are well known. For example, switching system 1016, in cooperation with processor 1004, can determine a destination of a packet of data arriving on input interface 1014 and send it to the correct destination using output interface 1019. The destinations may include host 1024, server 1030, other end stations, or other routing and switching devices in local network 1022 or Internet 1028.

The invention is related to the use of computer system 1000 for updating probabilistic network routing information. According to one embodiment of the invention, computer system 1000 provides for updating probabilistic network routing information in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. One or more processors in a multi-processing arrangement may also be employed to execute the sequences of instructions contained in main memory 1006. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Communication interface 1018 also provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for updating probabilistic network routing information as described herein.

Processor 1004 may execute the received code as it is received and/or stored in storage device 1010 or other non-volatile storage for later execution. In this manner, computer system 1000 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of updating probabilistic network routing information, the method comprising the computer-implemented steps of:

receiving a first data packet that contains at least one identity of a router through which the first data packet was transmitted;

updating the first data packet to contain an identity of a router whose identity was not previously contained in the first data packet;

based on a set of router-probability associations that is associated with a destination router for which the first data packet is destined, selecting a first router from a set of routers;

transmitting the updated first data packet to the first router;

receiving a second data packet that contains information that was contained in the first data packet; and based on the information, updating the set of router-probability associations.

2. A method as recited in claim 1, further comprising the computer-implemented steps of:

receiving a third data packet that identifies a destination network address that is contained in a subnet;

selecting a particular destination router that is associated, in a routing table, with the subnet;

based on a set of router-probability associations that is associated with the particular destination router, selecting a second router from a set of routers; and transmitting the third data packet to the second router;

wherein the destination network address differs from a network address of the particular destination router.

3. A method of updating probabilistic network routing information, the method comprising the computer-implemented steps of:

receiving, from a first router, a first data packet that identifies:
a destination router, and
a first router;

updating the first data packet to indicate:
an identity of a second router to which the first router transmitted the first data packet, and
the quality of a link through which the first router transmitted the first data packet to the second router;

selecting, from among one or more sets of router-probability associations, a particular set of router-probability associations that is associated with the destination router;

generating a first random value;

based on the first random value and the particular set of router-probability associations, selecting a third router from a set of routers;

transmitting the updated first data packet to the third router;

receiving, from the third router, a second data packet that indicates the quality of each link through which the first data packet was transmitted; and based on the quality of each link through which the first data packet was transmitted, updating the particular set of router-probability associations.

4. A method as recited in claim 3, further comprising the computer-implemented steps of:

receiving a third data packet that identifies the destination router and a subnet;

in response to receiving the third data packet, determining whether a routing table contains an association between a router and the subnet; and in response to determining that the routing table does not contain an association between a router and the subnet, adding, to the routing table, an association between the destination router and the subnet.

5. A method as recited in claim 3, further comprising the computer-implemented steps of:

adding, to a routing table, an association between the destination router and a subnet; and sending a third data packet that identifies the destination router and the subnet.

6. A method as recited in claim 3, further comprising the computer-implemented steps of:

receiving a third data packet that identifies a particular router;

in response to receiving the third data packet, determining whether the particular router is identified in a list; and in response to determining that the particular router is not identified in the list, performing the steps of:
adding the particular router's identity to the list, and
sending a fourth data packet to the particular router;

wherein the fourth data packet identifies the destination router and a subnet that is associated with the destination router.

7. A method as recited in claim 3, further comprising the computer-implemented steps of:

receiving a third data packet that indicates that the destination router has been removed; and in response to receiving the third data packet, removing, from a routing table, an association between the destination router and a subnet.

8. A method as recited in claim 3, further comprising the computer-implemented steps of:

removing, from a routing table, an association between the destination router and a subnet; and sending a third data packet that indicates that the destination router has been removed.

9. A method as recited in claim 3, further comprising the computer-implemented steps of:

determining whether a specified amount of time has passed since a data packet was received from a particular router; and in response to determining that the specified amount of time has passed since a data packet was received from the particular router, performing the steps of:
removing the particular router's identity from a list; and
sending a third data packet that indicates that the particular router has been removed.

10. A method as recited in claim 3, further comprising the computer-implemented steps of:

receiving a third data packet that identifies the destination router and a subnet;

in response to receiving the third data packet, determining whether a routing table contains an association between the subnet and a router other than the destination router; and in response to determining that the routing table contains an association between the subnet and a router other than the destination router, performing the steps of:
removing, from the routing table, an association that includes the subnet, and adding, to the routing table, an association between the subnet and a virtual destination router.

11. A method as recited in claim 3, further comprising the computer-implemented steps of:

removing, from a routing table, an association that includes a subnet;

adding, to the routing table, an association between the subnet and a virtual destination router; and sending a third data packet that identifies the virtual destination router and the subnet.

12. A method as recited in claim 3, wherein the destination router is a virtual destination router.

13. A method as recited in claim 3, wherein:
the second data packet was generated by the third router; and
the third router differs from the destination router.

14. A method as recited in claim 3, wherein the first data packet and the second data packet are not mobile agents.

15. A method as recited in claim 3, wherein updating the particular set of router-probability associations based on the quality of each link through which the first data packet was transmitted comprises updating the particular set of router-probability associations based on a Border Gateway Protocol external route cost metric.

16. A method as recited in claim 3, further comprising the computer-implemented steps of:

receiving a third data packet that identifies a destination network address;

selecting, from among a set of destination routers, a particular destination router that is associated, in a routing table, with a subnet that contains the destination network address;

selecting, from among one or more sets of router-probability associations, a set of router-probability associations that is associated with the particular destination router;

generating a second random value;

based on the second random value and the set of router-probability associations that is associated with the particular destination router, selecting a particular router from a set of routers; and transmitting the third data packet to the particular router.

17. A computer-readable medium carrying one or more sequences of instructions for updating probabilistic network routing information, which instructions, when executed by one or more processors, cause the one or more processors to carry out the steps of:

receiving, from a first router, a first data packet that identifies:
a destination router, and
a first router;

updating the first data packet to indicate:
an identity of a second router to which the first router transmitted the first data packet, and
the quality of a link through which the first router transmitted the first data packet to the second router;

selecting, from among one or more sets of router-probability associations, a particular set of router-probability associations that is associated with the destination router;

generating a first random value;

based on the first random value and the particular set of router-probability associations, selecting a third router from a set of routers;

transmitting the updated first data packet to the third router;

receiving, from the third router, a second data packet that indicates the quality of each link through which the first data packet was transmitted; and based on the quality of each link through which the first data packet was transmitted, updating the particular set of router-probability associations.

18. An apparatus for updating probabilistic network routing information, comprising:
means for receiving, from a first router, a first data packet that identifies:
a destination router, and
a first router;
means for updating the first data packet to indicate:
an identity of a second router to which the first router transmitted the first data packet, and
the quality of a link through which the first router transmitted the first data packet to the second router;
means for selecting, from among one or more sets of router-probability associations, a particular set of router-probability associations that is associated with the destination router;
means for generating a first random value;
means for selecting, based on the first random value and the particular set of router-probability associations, a third router from a set of routers;
means for transmitting the updated first data packet to the third router;
means for receiving, from the third router, a second data packet that indicates the quality of each link through which the first data packet was transmitted; and
means for updating, based on the quality of each link through which the first data packet was transmitted, the particular set of router-probability associations.

19. An apparatus as recited in claim 18, further comprising:
receiving a third data packet that identifies the destination router and a subnet;
means for determining, in response to receiving the third data packet, whether a routing table contains an association between a router and the subnet; and
means for adding, to the routing table, in response to determining that the routing table does not contain an association between a router and the subnet, an association between the destination router and the subnet.

20. An apparatus as recited in claim 18, further comprising:
means for adding, to a routing table, an association between the destination router and a subnet; and
means for sending a third data packet that identifies the destination router and the subnet.

21. An apparatus as recited in claim 18, further comprising:
means for receiving a third data packet that identifies a particular router;
means for determining, in response to receiving the third data packet, whether the particular router is identified in a list; and
means for performing, in response to determining that the particular router is not identified in the list, the steps of:
adding the particular router's identity to the list, and
sending a fourth data packet to the particular router;
wherein the fourth data packet identifies the destination router and a subnet that is associated with the destination router.

22. An apparatus for updating probabilistic network routing information, comprising:
a network interface that is coupled to a data network for receiving one or more packet flows therefrom;
a processor;
one or more stored sequences of instructions which, when executed by the processor, cause the processor to carry out the steps of:
receiving, from a first router, a first data packet that identifies:
a destination router, and
a first router;
updating the first data packet to indicate:
an identity of a second router to which the first router transmitted the first data packet, and
the quality of a link through which the first router transmitted the first data packet to the second router;
selecting, from among one or more sets of router-probability associations, a particular set of router-probability associations that is associated with the destination router;
generating a first random value;
based on the first random value and the particular set of router-probability associations, selecting a third router from a set of routers;
transmitting the updated first data packet to the third router;
receiving, from the third router, a second data packet that indicates the quality of each link through which the first data packet was transmitted; and
based on the quality of each link through which the first data packet was transmitted, updating the particular set of router-probability associations.

23. An apparatus as recited in claim 22, wherein the one or more stored sequences of instructions include instructions, which, when executed by the processor, cause the processor to carry out the further steps of:
receiving a third data packet that identifies the destination router and a subnet;
in response to receiving the third data packet, determining whether a routing table contains an association between a router and the subnet; and
in response to determining that the routing table does not contain an association between a router and the subnet, adding, to the routing table, an association between the destination router and the subnet.

24. An apparatus as recited in claim 22, wherein the one or more stored sequences of instructions include instructions, which, when executed by the processor, cause the processor to carry out the further steps of:
adding, to a routing table, an association between the destination router and a subnet; and
sending a third data packet that identifies the destination router and the subnet.

25. An apparatus as recited in claim 22, wherein the one or more stored sequences of instructions include instructions, which, when executed by the processor, cause the processor to carry out the further steps of:
receiving a third data packet that identifies a particular router;
in response to receiving the third data packet, determining whether the particular router is identified in a list; and
in response to determining that the particular router is not identified in the list, performing the steps of:
adding the particular router's identity to the list, and
sending a fourth data packet to the particular router;
wherein the fourth data packet identifies the destination router and a subnet that is associated with the destination router.

26. An apparatus as recited in claim 22, wherein the one or more stored sequences of instructions include instructions, which, when executed by the processor, cause the processor to carry out the further steps of:
   receiving a third data packet that indicates that the destination router has been removed; and
   in response to receiving the third data packet, removing, from a routing table, an association between the destination router and a subnet.

27. An apparatus as recited in claim 22, wherein the one or more stored sequences of instructions include instructions, which, when executed by the processor, cause the processor to carry out the further steps of:
   removing, from a routing table, an association between the destination router and a subnet; and
   sending a third data packet that indicates that the destination router has been removed.

28. An apparatus as recited in claim 22, wherein the one or more stored sequences of instructions include instructions, which, when executed by the processor, cause the processor to carry out the further steps of:
   determining whether a specified amount of time has passed since a data packet was received from a particular router; and
   in response to determining that the specified amount of time has passed since a data packet was received from the particular router, performing the steps of:
      removing the particular router's identity from a list; and
      sending a third data packet that indicates that the particular router has been removed.

29. An apparatus as recited in claim 22, wherein the one or more stored sequences of instructions include instructions, which, when executed by the processor, cause the processor to carry out the further steps of:
   receiving a third data packet that identifies the destination router and a subnet;
   in response to receiving the third data packet, determining whether a routing table contains an association between the subnet and a router other than the destination router; and
   in response to determining that the routing table contains an association between the subnet and a router other than the destination router, performing the steps of:
      removing, from the routing table, an association that includes the subnet, and
      adding, to the routing table, an association between the subnet and a virtual destination router.

30. An apparatus as recited in claim 22, wherein the one or more stored sequences of instructions include instructions, which, when executed by the processor, cause the processor to carry out the further steps of:
   removing, from a routing table, an association that includes a subnet;
   adding, to the routing table, an association between the subnet and a virtual destination router; and
   sending a third data packet that identifies the virtual destination router and the subnet.

31. An apparatus as recited in claim 22, wherein the destination router is a virtual destination router.

32. An apparatus as recited in claim 22, wherein:
   the second data packet was generated by the third router; and
   the third router differs from the destination router.

33. An apparatus as recited in claim 22, wherein the first data packet and the second data packet are not mobile agents.

34. An apparatus as recited in claim 22, wherein updating the particular set of router-probability associations based on the quality of each link through which the first data packet was transmitted comprises updating the particular set of router-probability associations based on a Border Gateway Protocol external route cost metric.

35. An apparatus as recited in claim 22, wherein the one or more stored sequences of instructions include instructions, which, when executed by the processor, cause the processor to carry out the further steps of:
   receiving a third data packet that identifies a destination network address;
   selecting, from among a set of destination routers, a particular destination router that is associated, in a routing table, with a subnet that contains the destination network address;
   selecting, from among one or more sets of router-probability associations, a set of router-probability associations that is associated with the particular destination router;
   generating a second random value;
   based on the second random value and the set of router-probability associations that is associated with the particular destination router, selecting a particular router from a set of routers; and
   transmitting the third data packet to the particular router.

36. A computer-readable medium carrying one or more sequences of instructions for updating probabilistic network routing information, which instructions, when executed by one or more processors, cause the one or more processors to carry out the steps of:
   receiving a first data packet that contains at least one identity of a router through which the first data packet was transmitted;
   updating the first data packet to contain an identity of a router whose identity was not previously contained in the first data packet;
   based on a set of router-probability associations that is associated with a destination router for which the first data packet is destined, selecting a first router from a set of routers;
   transmitting the updated first data packet to the first router;
   receiving a second data packet that contains information that was contained in the first data packet; and
   based on the information, updating the set of router-probability associations.

37. An apparatus for updating probabilistic network routing information, comprising:
   means for receiving a first data packet that contains at least one identity of a router through which the first data packet was transmitted;
   means for updating the first data packet to contain an identity of a router whose identity was not previously contained in the first data packet;
   means for selecting, based on a set of router-probability associations that is associated with a destination router for which the first data packet is destined, a first router from a set of routers;
   means for transmitting the updated first data packet to the first router;
   means for receiving a second data packet that contains information that was contained in the first data packet; and
   means for updating, based on the information, the set of router-probability associations.

38. An apparatus for updating probabilistic network routing information, comprising:
   a network interface that is coupled to a data network for receiving one or more packet flows therefrom;

a processor;
one or more stored sequences of instructions which, when executed by the processor, cause the processor to carry out the steps of:
- receiving a first data packet that contains at least one identity of a router through which the first data packet was transmitted;
- updating the first data packet to contain an identity of a router whose identity was not previously contained in the first data packet;
- based on a set of router-probability associations that is associated with a destination router for which the first data packet is destined, selecting a first router from a set of routers;
- transmitting the updated first data packet to the first router;
- receiving a second data packet that contains information that was contained in the first data packet; and
- based on the information, updating the set of router-probability associations.

39. An apparatus as recited in claim 38, wherein the one or more stored sequences of instructions include instructions, which, when executed by the processor, cause the processor to carry out the further steps of:
- receiving a third data packet that identifies a destination network address that is contained in a subnet;
- selecting a particular destination router that is associated, in a routing table, with the subnet;
- based on a set of router-probability associations that is associated with the particular destination router, selecting a second router from a set of routers; and
- transmitting the third data packet to the second router;
- wherein the destination network address differs from a network address of the particular destination router.

* * * * *